Oct. 10, 1967  R. E. G. BOOLE  3,345,831
FLEXIBLE COUPLINGS
Filed July 2, 1965  4 Sheets-Sheet 1
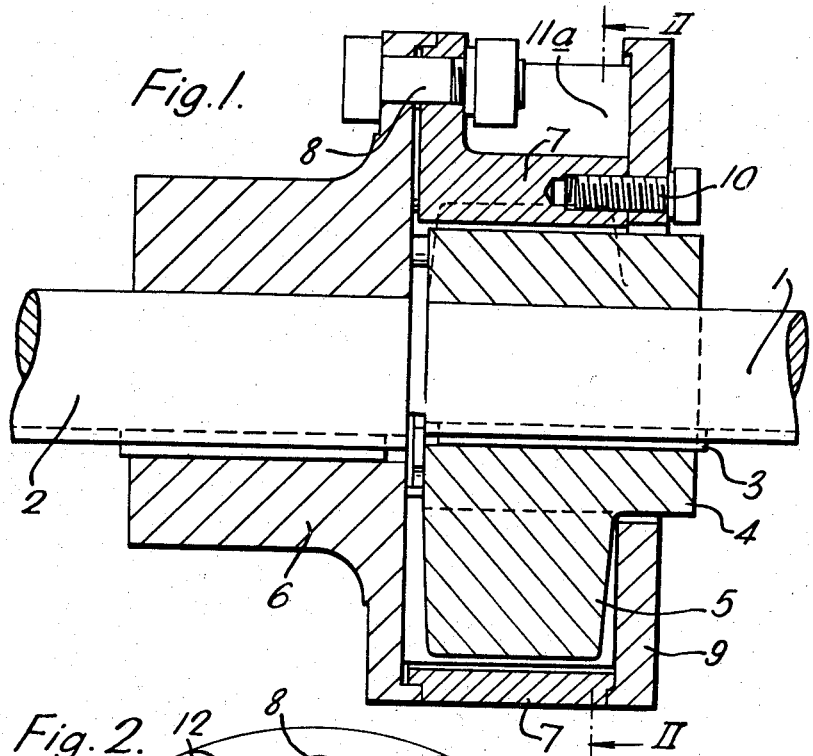
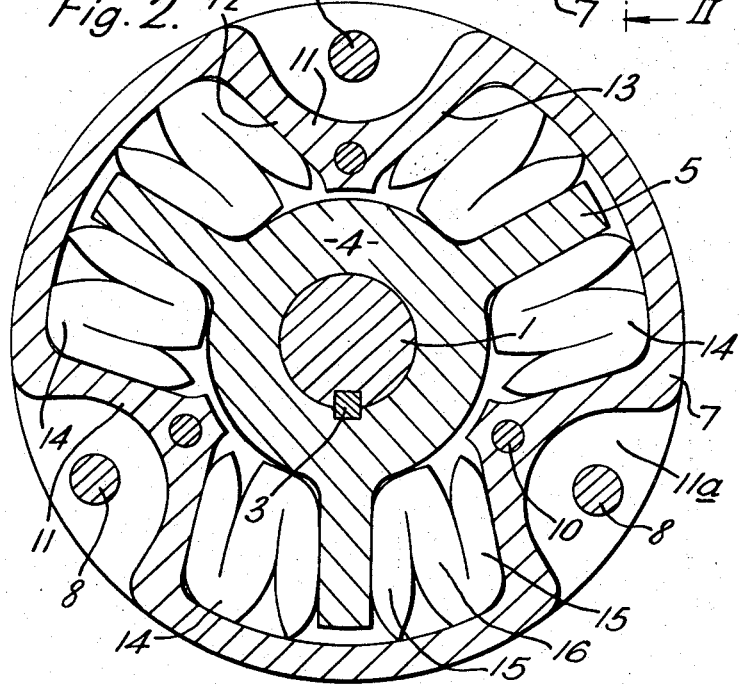
INVENTOR
REGINALD EDWARD GEORGE BOOLE
BY
Bacon & Thomas
ATTORNEYS Oct. 10, 1967   R. E. G. BOOLE   3,345,831
FLEXIBLE COUPLINGS
Filed July 2, 1965   4 Sheets-Sheet 2
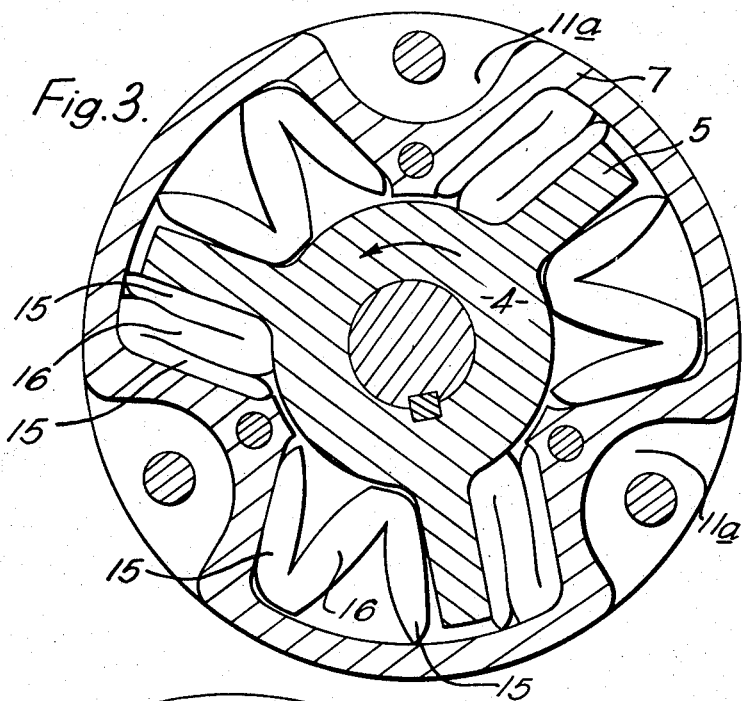
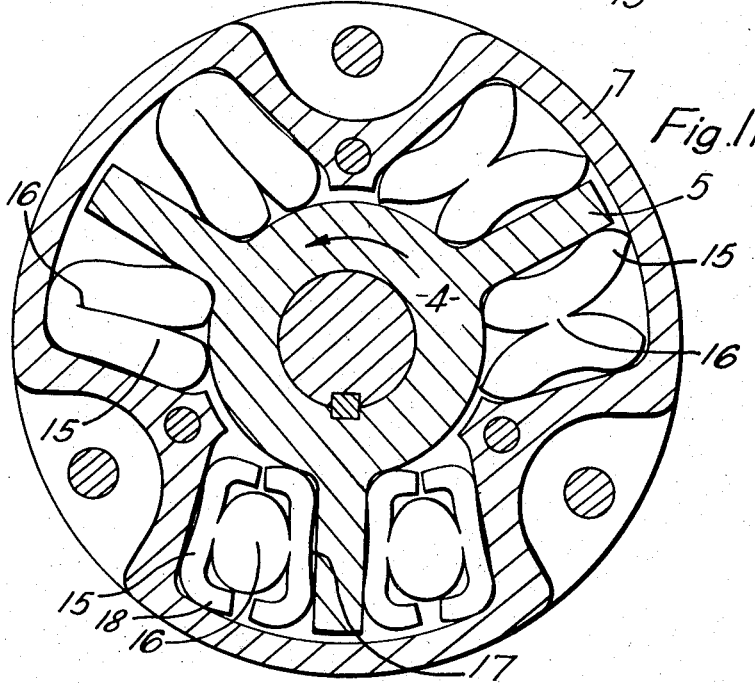
INVENTOR
REGINALD EDWARD GEORGE BOOLE
BY
Bacon & Thomas
ATTORNEYS

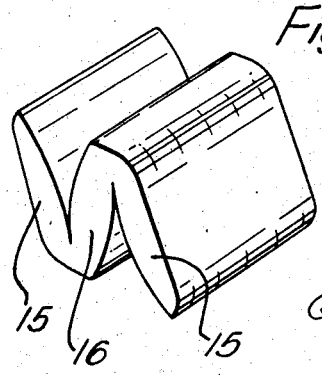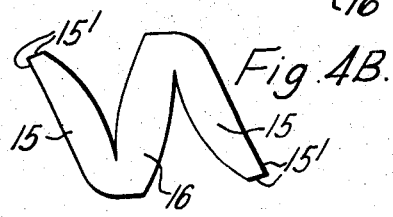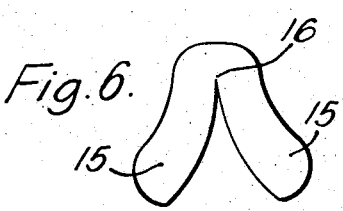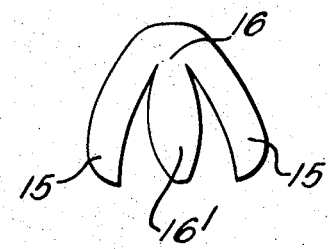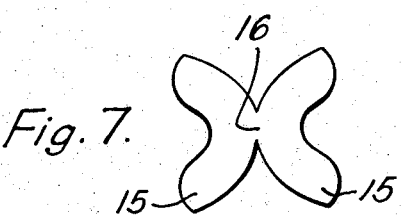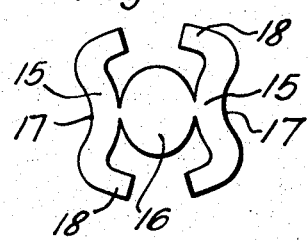

Oct. 10, 1967  R. E. G. BOOLE  3,345,831
FLEXIBLE COUPLINGS
Filed July 2, 1965  4 Sheets-Sheet 4
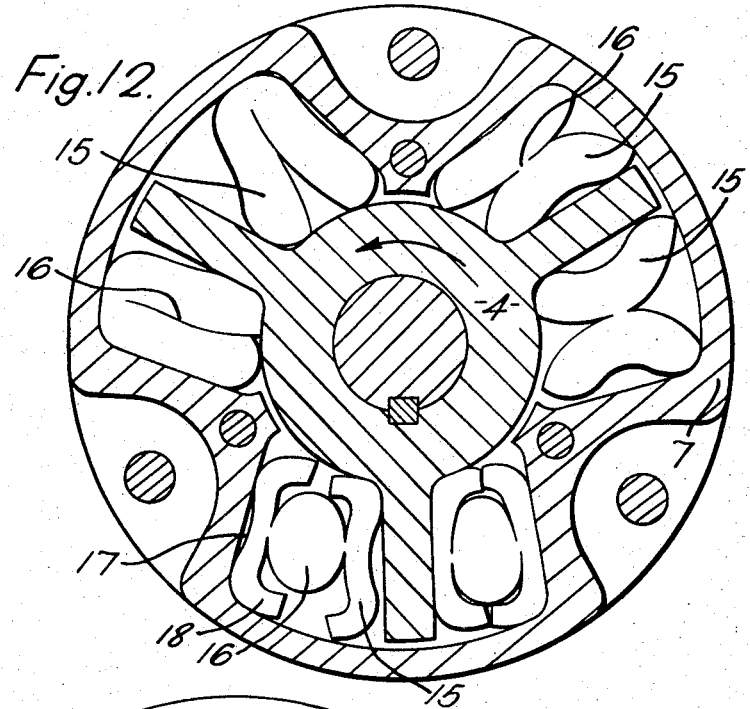
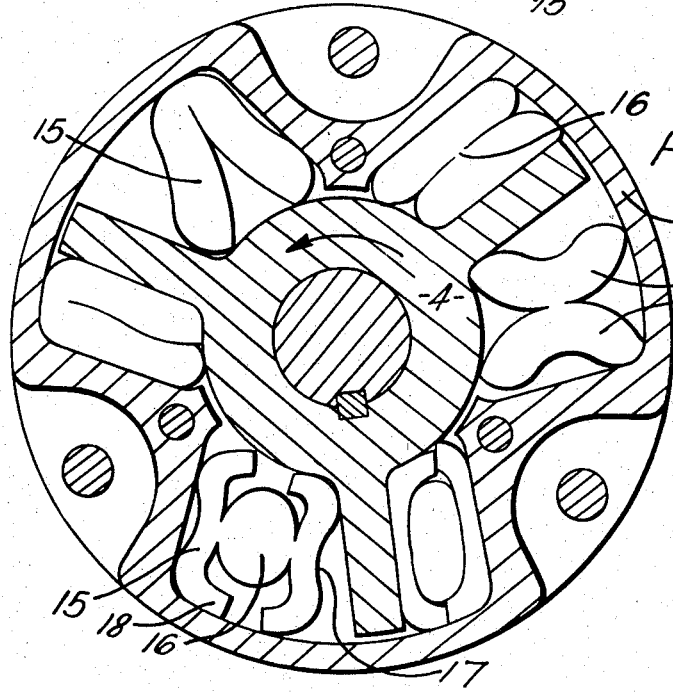
INVENTOR
REGINALD EDWARD GEORGE BOOLE
BY
Bacon & Thomas
ATTORNEYS

United States Patent Office 3,345,831
Patented Oct. 10, 1967

3,345,831
FLEXIBLE COUPLINGS
Reginald Edward George Boole, Harpenden, England, assignor to The Wellman Bibby Company Limited, London, England, a British company
Filed July 2, 1965, Ser. No. 469,204
Claims priority, application Great Britain, Aug. 7, 1964, 32,310/64
15 Claims. (Cl. 64—14)

This invention is concerned with improvements in or relating to flexible couplings, dampers, flexible gear wheels and the like for connection between a driving member and a driven member, to transmit torque. It is furthermore concerned with couplings of the general type comprising two concentric members which each have a number of blades or arms which extend substantially radially of the members and are so arranged that each blade on one member extends between a pair of blades on the other member so that a cell is formed between each pair of adjacent blades and portions of the concentric members. Such couplings are completed by the introduction into each cell of a coupling element of rubber or other elastomeric material which provides a resilient and reversible connection between the two members. Such couplings are hereafter referred to as "couplings of the kind described."

In couplings of the kind described utilising a single block of rubber or the like as the coupling element in each cell it has frequently been difficult to insert such blocks into the cells when installing the coupling or when replacement is necessary especially when some deformation of the blocks is necessary.

A further disadvantage of couplings of the kind described has been that depending on the physical characteristics of the elastomeric material employed for the block the response of the coupling to differing loads has varied. Thus with blocks of relatively soft material the coupling exhibits a flexible response to light torque loads and therefore a large deflection under a heavy torque which is frequently undesirable while with a hard material a stiff response and a small deflection is exhibited under heavy torque loading but only at the expense of having very small deflections under low torque loading. Indeed with known couplings of the type described it is only over a narrow range of applied torques that the correct degree of flexible response to a light load and a stiff response to a heavy load can be achieved by careful selection of the material from which the blocks are made.

With a view to overcoming these disadvantages it has been proposed to provide a coupling of the type described in which the coupling element in each cell is made up of two or more components of non-metallic resilient material at least one component in each cell being of a soft materials and at least another component in each cell being of a harder material, the components being so disposed and arranged with respect to each other that upon the application of torque to one member relative movement takes place between adjacent contacting surfaces of the respective components of the coupling element. Such couplings provide a satisfactory solution to the problem of providing a soft response at low torque and a stiff response at high torque but each coupling element is made up of at least two and sometimes three or more elements which require to be inserted into the cells.

We have now found that a satisfactory coupling of the type described which will have a soft response to low torque and a stiff response to high torque over a wide range of applied torque loads can be produced with only a single coupling element in each cell.

According to the invention therefore there is provided a coupling of the type described in which the coupling element in each cell comprises an integral non-metallic resilient element having two or more limbs and a connecting portion, which limbs are adapted to engage on opposite walls of the cell, said limbs and connecting portion being so shaped that upon the application of torque to the coupling the limbs are initially deflected by bending with respect to the connecting portion so as progressively to increase the area of surface contact between the limbs or between the limbs and the connecting portion, whereby the limbs and the connecting portion are subjected to an increasing rate of compression and a decreasing rate of bending deflection as the applied torque increases.

When such coupling elements are inserted into a coupling and torque is applied the deflecting by bending of the limbs with respect to the connecting portion provides a soft response while as the area of contact between the limbs or between the limbs and the connecting portion increases and the rate of compression increases the response of the coupling to increasing torque becomes correspondingly stiffer. Thus by suitable design of the limbs and connecting portion of the elements it is possible to provide a coupling having the required response over a wide range of applied torque loads.

The elements themselves can be made of any natural or synthetic rubber or rubber-like material having elastomeric properties.

A wide variety of shapes of coupling element can be used in couplings according to the invention although it is preferred to provide elements which are of symmetrical shape so as to enable the elements to be used in couplings of varying sizes. It will be appreciated that if a coupling for a given maximum load has three pairs of cells spaced around its axis a larger coupling can be provided with a greater number, say 4, 6 or 8 pairs of cells, depending upon the size required. All such pairs of cells in the various couplings can be made of the same size so that elements of symmetrical shape can be used in any size coupling.

The limbs of the coupling elements will in general be of a length, not greater and preferably slightly less than the radial length of the cell for which the element is intended, and upon insertion into the cells of a coupling there will be at least partial contact between each blade or wall of the cell and a limb of the element. It will in general be desirable so to shape the elements that when inserted into the coupling and with no torque applied to the coupling a small, initial deflection of the limbs and therefore some surface contact between the limbs and the connecting portion is effected so that the elements in the trailing cell of each pair of cells with respect to the direction of rotation of the coupling will still engage the cell walls at least partially and will not tend to become displaced.

The connecting portions may have various shapes. Thus for instance a generally circular or elliptical connecting portion may be provided with elongate and parallel limbs extending on either side thereof, the limbs being connected to the connecting portion substantially tangentially or by means of short arms extending from the connecting portion. If desired the elements may have the general form of the letter W, the two outer strokes comprising the limbs while the two central strokes constitute the connecting portion. Again a V shaped element may be provided the junction between the two limbs constituting the connecting portion. Such connecting portion can itself be of strip shape extending between the two limbs thus forming a three pronged element.

In a particularly preferred form of element the connecting portion is of elongate form and has a limb connected to each end, the limbs extending in opposite directions and thus forming an element somewhat similar to a letter Z.

While the limbs may be generally straight sided, these are preferably curved over at least part of their length and may indeed be of arcuate shape if desired.

The outer surfaces of the ends of the limbs may be curved to facilitate fitting the elements in the cells although it may be preferred to provide a sharp corner at the junction between the outer surface and end of the limbs since this tends to restrain any tendency of the element to rotate within the cell when not under load.

The driving and driven members of the coupling can have any desired number of blades depending on the number of cells and the size of coupling to be provided. It is particularly preferred according to another feature of the invention so to construct the driving and driven members that the blades which constitute the walls of the coupling cells through which torque is being transmitted only become substantially parallel to each other when substantially the maximum torque is being applied since this provides a more uniform distribution of stress over the coupling elements when maximum compression is being applied.

In order that the invention may be well understood a preferred form of coupling according to the invention and several preferred shapes of coupling element for use therein will be further described by way of example only and with reference to the accompanying drawings in which:

FIGURE 1 shows an axial section of a coupling according to the invention,

FIGURE 2 shows a section on the line II—II of FIGURE 1, the coupling having no torque applied thereto, FIGURE 3 shows a similar view to FIGURE 2 but with maximum torque applied, FIGURE 4A shows an end view of the coupling element used in the coupling of FIGURES 1 to 3, FIGURE 4B shows a similar view of a modified coupling element, FIGURE 5 is a perspective view of the element of FIG. 4A, FIGURES 6 to 10 inclusive show end views of various alternative coupling elements for use in couplings according to the invention, FIGURES 11, 12 and 13 each show a cross section through the coupling of FIGURES 1 to 3, such coupling having in the three pairs of cells elements as shown in FIGURES 6, 7 and 8 respectively.

In FIGURE 11 the elements are shown in the condition of no applied torque.

FIGURE 13 shows the position of maximum applied torque and FIGURE 12 shows an intermediate position.

FIGURES 1 to 3 show a coupling of the type described for transmitting torque between a driving shaft 1 and and a driven shaft 2. Keyed to the shaft 1 at 3 is an inner coupling member 4 having three substantially radial blades 5 integral therewith.

The driven shaft 2 has a boss 6 keyed thereto which has an outer coupling member 7 bolted thereto at 8. An end plate 9 for this outer coupling member 7 is bolted thereto at 10. If desired this end plate 9 could be made integrally with the outer coupling member 7.

The outer coupling member is provided with three equally spaced and somewhat triangularly shaped projections 11 the sides 12 and 13 of which extend between two blades 5 of the inner members 4 and each of which with one side of a blade 5 define a cell for a coupling element which is additionally bounded by the inner and outer members. It will be noted that the projections 11 also define arcuate recesses 11a spaced around the outer member which serve to accommodate the heads of bolts 8. This arrangement is of particular advantage since it provides the maximum effective radius of the coupling members and thus permits a large inner member 4 and hence a large shaft 1 to be accommodated.

It will be seen from FIG. 2, where no torque is applied, that the sides 12 and 13 are not parallel with the respective sides of the blades 5 with which they form a cell. The arrangement is however such that when maximum torque is applied as in FIG. 3 the walls of the cell of each pair of cells through which torque is being applied are substantially parallel thus giving a better distribution of stress over the surface of the compressed coupling elements 14.

A coupling as above described can be simply assembled and fitted with a set of coupling elements. Thus the end plate 9 is first placed over the driving shaft 1, whereafter the inner member 4 is inserted into the outer member 7 and keyed on the driving shaft. The inner and outer members are then separated sufficiently to enable the elements 14 to be inserted one to each cell. As shown in FIGURE 2 the limbs 15 of each element 14 are part deflected with respect to their connecting portion 16 so as to ensure that each limb engages along one wall of its cell. Thereafter the end plate 9 is bolted to the outer member 7 at 10 and the latter is bolted to the boss 6 at 8.

FIGURES 4A and 5 show the coupling element 14 used in the coupling of FIGURES 1 and 2. As will be seen the element comprises two elongate limbs 15 which are connected at opposite ends of an elongate connecting portion 16, the limbs extending in opposite directions to form an element of somewhat Z shape. The ends of the two limbs are tapered and the outer surface of the element at the ends of the limbs and at their connection to the connecting portion is curved to facilitate fitting the element in the junctions between the peripheral boundaries and the radial boundaries of the cells.

FIGURE 4B shows a modified form of the element of FIGURE 4A and it will be seen that each limb 15 has a sharp corner 15' formed at its free end. The outer and end surfaces which meet at this sharp corner by engaging on a blade or an annular wall of the cell will serve to restrain the element from any tendency to rotate in the cell when it is relaxed, i.e. when the adjacent cell is for instance under maximum load.

It will be understood that if desired a sharp corner at the free end of the limbs can also be provided in the elements to be described hereafter with reference to FIGURES 6, 7, 9 and 10.

FIGURE 2 shows the limbs 15 in each cell deflected with respect to the connecting portion 16 so that approximately ½ of the side surface area of each limb is in contact with the adjacent surface of the connecting portion. As torque is applied to the coupling the limbs 15 will be further deflected in a direction increasing their area of surface contact with the connecting portion. While the rate of deflection of the limbs by bending is high, with respect to the rate of compression of the elements the response of the coupling will be soft. As the area of the surface contact increases however a greater proportion of the coupling element is subjected to compression and hence the torsional spring rate rises with increasing torque to give an increasingly stiff response of the coupling.

As will be seen from FIG. 3 where maximum torque has been applied in the direction of the arrow one coupling element in each pair of cells has been subjected to maximum deflection so that substantially the whole of the surface area of each limb 15 is in contact with the adjacent surface area of the connecting portion 16. Thus the element is being subjected almost solely to compression and exhibits a stiff response. On the other cell of each pair it will be seen that the coupling element while almost completely relaxed is still making surface contact with the opposite walls of the cell over a substantial length thereof thus avoiding any risk of the elements becoming dislodged or displaced.

FIGURE 6 shows a coupling element of generally inverted V shape in which limbs 15 are connected by a connecting portion 16 at the apex.

FIGURE 7 shows an element having generally arcuate limbs 15 disposed back to back with an intermediate connecting portion at their junction.

FIGURE 8 shows an element having a generally circular connecting portion and elongate limbs 15 on either side thereof. The limbs are of arcuate shape at 17 intermediate their ends 18 which are turned inwardly towards each other. We have found that the arcuate shape at 17 of the limbs tends to assist the limbs to make surface contact along the walls of the cell as soon as torque is applied to the coupling.

FIGURE 9 shows another coupling element having two limbs 15 and a connecting portion 16 which is extended by a striplike portion 16'.

In FIGURE 10 yet another coupling element is shown which is of generally W shape the two outer strokes constituting limbs 15 while the two centre strokes form the connecting portion 16.

In order to show the behavior of some of the coupling elements in use reference is made to FIGURES 11, 12 and 13 in which elements according to FIGURES 6, 7 and 8 respectively, have been inserted into adjacent pairs of cells of a coupling as shown in FIGURES 1 to 3. FIGURE 11 shows each element of a pair in the condition of no torque applied and with the elements each engaging the walls of the respective cells.

FIGURE 12 shows the condition of the coupling after the application of torque and after the limbs of the elements which transmit the torque have been deflected by bending to increase their surface contact with each other and/or with the connection portion, thus increasing the stiffness of the response of the coupling.

FIGURE 13 shows the condition where the maximum torque is applied to the coupling and where the rate of compression to which the coupling elements are subjected is at a maximum while the rate of deflection of the limbs is reduced to a minimum with the result that the coupling gives a stiff response.

It will furthermore be seen that all the elements in the trailing cell, with reference to the direction of applied torque are still in engagement with the opposite walls of the cells so that no risk of the elements becoming dislodged or displaced arises.

It will be appreciated that the shape of coupling element used in any coupling will depend on the nature of the required response at different torque loads. Thus while an initial soft response to the application of torque is always required, the torque load at which a stiff response is required may well vary. In the embodiments shown the element shown in FIG. 7 gives a stiffer response than that shown in FIG. 6 which is itself stiffer than that shown in FIGURE 9. The element shown in FIGURES 4 and 5 has a response which is less stiff than that of FIGURE 9.

It will be seen that there has been provided a coupling of the type described in which each cell has a single homogeneous coupling element which enables a soft response to be provided upon the initial application of torque and a stiff response to be provided as the torque increases. A number of preferred embodiments of coupling elements have been described above by way of example only and it will be understood that many other shapes of coupling element can be made without departing from the scope of the invention.

I claim:

1. A flexible coupling comprising a driving member and a driven member concentric therewith said driving and driven members each having a plurality of generally radially extending blades with one blade on one member extending between a pair of blades on the other members so as to form a cell between each pair of adjacent blades and parts of the concentric members, and an integral non-metallic resilient coupling element in each cell each coupling element having at least two limbs and a connecting portion, the limbs engaging opposite walls of the cell and the limbs and connecting portion being so shaped that upon the application of torque to the coupling the limbs, in at least one of said cells, are initially deflected by bending with respect to the connecting portion so as progressively to increase the area of surface contact between the limbs and the connecting portion, whereby the limbs and the connecting portion are subjected to an increasing rate of compression and a decreasing rate of bending deflection as the applied torque increases.

2. A flexible coupling comprising a driving member and a driven member concentric therewith said driving and driven members each having a plurality of generally radially extending blades with one blade on one member extending between a pair of blades on the other members so as to form a cell between each pair of adjacent blades and parts of the concentric members, and an integral non-metallic resilient coupling element in each cell each coupling element having at least two interconnected elongate limbs, which limbs engage opposite walls of the cell, the arrangement of the limbs being such that upon the application of torque to the coupling said limbs, in at least one of said cells, are initially subjected to bending without appreciable compression which increases the area of surface contact between one of the limbs and the associated cell wall whereupon the limbs are subjected to an increasing rate of compression and a decreasing rate of bending deflection as the applied torque increases.

3. A flexible coupling as claimed in claim 2 in which the limbs are of a length slightly less than the radial length of the cell there being at least partial contact between each blade and a limb of the element.

4. A flexible coupling as claimed in claim 2 in which the coupling elements are so shaped that when no torque is applied there is a small initial deflection of the limbs and a consequent surface contact between the limbs and the connecting portion.

5. A flexible coupling as claimed in claim 2 in which said limbs are of elongate strip like shape engageable against opposite sides of the connecting portion.

6. A flexible coupling as claimed in claim 2 in which the coupling elements have limbs of elongate strip like shape engageable on opposite sides of a connecting portion of elongate strip like shape.

7. A flexible coupling as claimed in claim 2 in which each coupling element is shaped like a letter Z.

8. A flexible coupling as claimed in claim 2 in which each element is of three pronged shape the connecting portion extending between two limbs.

9. A flexible coupling as claimed in claim 2 in which each coupling element is of generally W shape the two outer strokes comprising the limbs while the two central strokes constitute the connecting portion.

10. A flexible coupling as claimed in claim 2 in which each coupling element is of generally V shape the junction of the limbs constituting the connection portion.

11. A flexible coupling as claimed in claim 2 in which the limbs of the coupling elements are of arcuate shape disposed back to back and joined by the connecting portion.

12. A flexible coupling as claimed in claim 2 in which the free ends of the limbs of the coupling elements terminate in a sharp corner.

13. A flexible coupling as claimed in claim 2 in which the said connecting portion is of generally circular shape having elongate limbs extending on either side thereof.

14. A flexible coupling as claimed in claim 2 in which said connecting portion is of generally circular shape having elongate limbs extending on either side thereof the limbs being connected substantially tangentially to the connecting portion.

15. A flexible coupling as claimed in claim 2 in which the outer of said two concentric members has a plurality of equally spaced generally triangularly shaped projections extending between two blades of the inner concentric member, which projections are shaped to provide outwardly open recesses spaced around the exterior of the outer member whereby to accommodate the head of a bolt.

References Cited

UNITED STATES PATENTS

| 1,504,279 | 8/1924 | Spicer | 64—14 |
| 1,862,140 | 6/1932 | Guy | 64—14 |
| 3,195,324 | 7/1965 | Sellwood et al. | 64—14 |

FOREIGN PATENTS

| 241,363 | 10/1925 | Great Britain. |
| 669,724 | 4/1952 | Great Britain. |

HALL C. COE, *Primary Examiner.*